UNITED STATES PATENT OFFICE.

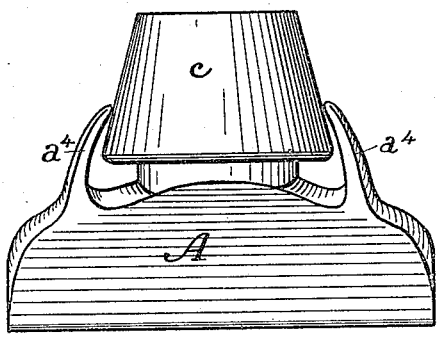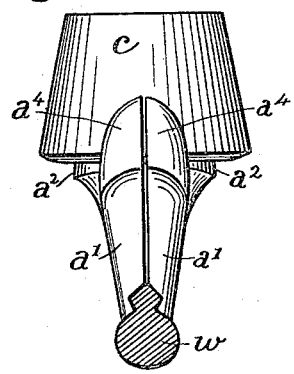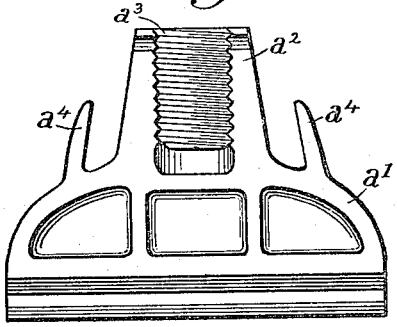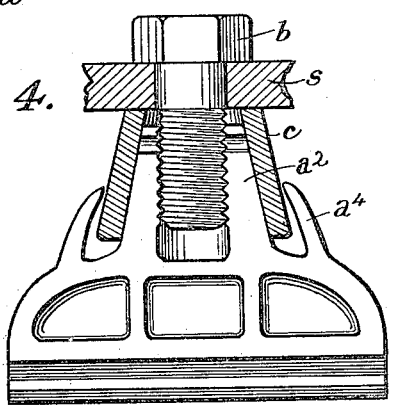

WILLIAM A. McCALLUM, OF TERRACE PARK, OHIO.

SUSPENDING DEVICE FOR TROLLEY-WIRES.

1,220,523.

Specification of Letters Patent. Patented Mar. 27, 1917.

Application filed March 9, 1916. Serial No. 83,108.

*To all whom it may concern:*

Be it known that I, WILLIAM A. McCALLUM, a citizen of the United States, residing at Terrace Park, in the county of Hamilton and State of Ohio, have invented new and useful Improvements in Suspending Devices for Trolley-Wires, of which the following is a specification.

My invention relates to suspending devices for trolley wires of electric railways of the class in which a two-part ear is clamped upon the trolley wire by compression of an embracing annulus first shown in U. S. Letters Patent No. 659,823, issued to me as inventor October 16, 1900.

The object of my present invention is to improve upon said device in certain particulars, to-wit: first, to secure the compression collar to the trolley ear in such wise as to prevent detachment, thus holding the parts together at all times as a unit ready for use, yet permitting full play of parts in their proper function; second, to dispense entirely as a necessary part of the unit with the central holding stud and the external nut which required connecting the device with a specially formed support, and provide means whereby the device may be attached with entire freedom of alinement to a cross bar of any kind by independent means, such an ordinary bolt operating to rigidly clamp the parts of the ear upon the trolley wire and the device as a whole to its support.

A further object is to shorten the suspension distance by keeping the wire as close up as may be to the under surface of the support, thus reducing the leverage of dislocating side-stress, and adapting it to use in situations having very little headroom.

These advantages combined are realized in a structure of extreme simplicity, requiring little or no machining, and consequently produced at the minimum of cost, while it is compact and thoroughly efficient.

The constructive principle involved in attaining the first of the above recited objects of the invention, may of course be employed separately and in other ear or clamp constructions. Wherever a compression ear is employed, such independent use is contemplated herein.

In the drawings herewith illustrating a structure embodying my invention,—

Figure 1 is a general side-view in elevation of the structure complete;

Fig. 2, a corresponding end-view of same;

Fig. 3, an elevation of one of the clamping members showing its inner or contact face; and Fig. 4, an elevation of the device complete as in use, attached to an overhead support, partly sectioned to show the relation of parts, and with part of the front or near clamping element partly broken away to show interior details.

Referring now to the drawings, A designates the "ear" or "clamp", consisting of two duplicate parts, $a^1$, $a^1$, seating together in a central longitudinal plane. At its lower longitudinal edge each part $a^1$ is formed to constitute half of an engaging socket for the trolley wire, $w$, as indicated in Figs. 2 and 4; while vertically the parts extend into symmetrical halves $a^2$ of a cone-frustum countersunk axially from above and threaded internally as shown in Fig. 3, at $a^3$, for the engagement of a suspending bolt $b$ as shown in Fig. 4. At each side of the cone, $a^2$, $a^2$, outwardly toward the ends of the clamping parts $a^1$ are upwardly projecting fingers $a^4$ symmetrically divided between the parts $a^1$; and, embracing the cone $a^2$, $a^2$, within the contact limits presented by the fingers $a^4$, is a corresponding conical annulus, $c$, constituting a compression ring, which is prevented from detachment by the position and spacing apart of the terminals of the fingers $a^4$ which define a limit less than the greatest diameter of the annulus $c$.

The function of parts involved in the mode of operation is as follows: To insert the trolley wire the annulus $c$ is held upward at its contact limit between the opposite fingers, $a^4$, which permits the parts $a^1$ to be separated sufficiently to admit the trolley wire to its seat provided for the purpose. The annulus being then forced downward upon the inclined outer surface of the cone frustum, $a^2$, $a^2$, constitutes a compression ring to hold the parts, $a^1$, together as a pair of clamping jaws, securely holding the trolley wire, $w$, between them as shown in Fig. 2. The device is then held up against the support $s$ (Fig. 4), and a suspending bolt $b$ is passed downward through a suitable aperture and into the upper end of the correspondingly threaded socket $a^3$ of the clamp A, and turned in the threads of the socket until the device is drawn up into close contact with the underside of the support.

In the sectioned portion of Fig. 4, the relation of parts in use is shown. The annulus $c$ is made a trifle wider than the height of the cone-frustum, $a^2$, $a^2$, and therefore contacts with the under surface of the support while the cone-frustum $a^2$, $a^2$, does not. It results, therefore, that the rotation of the bolt $b$ not only seats the parts of the device together, but also seats the device as a unit firmly against the support where it is rigidly held by frictional contact against rotation as well. It will be observed also that up to the point of final rigidity of connection with the support, the alinement of the device may be changed or readjusted at will without detachment from the support.

It will be observed also that in the described use of the device, the annulus, in addition to its function as a compression ring in relation to the clamping parts, also acts as a "jam nut" to hold the device in rigid attachment to the support.

While the bolt is a necessary element of fastening, it is intended to conform the construction to bolts of a common or conventional standard which may be readily supplied by the user.

The holding fingers or equivalent means to prevent removal of the compression ring may be employed and I do not limit myself to the "fingers" here shown. It is obvious also that such means in whatever form attaining the same end may also be used with other clamping devices embodying other modes of fastening to a support.

I claim as my invention and desire to secure by Letters Patent of the United States:

1. In a suspending ear for trolley wires, a two-part clamp; a compression collar seated thereon; and one or more projections upon the clamping parts extended into contacting engagement with the collar to prevent separation thereof from the ear.

2. In a clamping device for trolley wires, a two-part clamping ear having an upward conical extension, a correspondingly formed annulus seating upon said conical extension, and a plurality of upwardly extending fingers extending into the area of upward movement of the annulus constituting a lock preventing its removal from the clamping ear.

3. In a clamping device of the character indicated, a two-part clamping ear having an upward conical extension, a correspondingly formed annulus embracing said conical extension and a plurality of fingers extending upwardly from the body of the clamping parts into the area of upward movement of the annulus and constituting a lock against its removal from the clamp—each of said fingers being divided in the common plane of division of the clamping parts.

4. In a clamping device of the character indicated, the combination of a supporting element; a two-part clamping ear having an upward conical extension, and provided with a threaded socket countersunk between the parts of the said extension; a corresponding open-ended annulus seated upon said extension and extending somewhat above the same; and a screw bolt passing through said supporting bar and engaging in the threaded socket to draw the clamping parts upward within the annulus as a compression ring and draw the annulus into contact with the overhead support as a jam-nut holding the device and its parts in rigid connection and alinement with the supporting element.

In testimony whereof I have hereunto set my hand in presence of two subscribing witnesses.

WILLIAM A. McCALLUM.

Witnesses:
 WALTER A. KNIGHT,
 A. L. TILDESLEY.

Copies of this patent may be obtained for five cents each, by addressing the "Commissioner of Patents, Washington, D. C."